(12) United States Patent
Le Quere

(10) Patent No.: US 7,418,598 B1
(45) Date of Patent: Aug. 26, 2008

(54) ARCHITECTURE OF AN ENCRYPTION CIRCUIT IMPLEMENTING VARIOUS TYPES OF ENCRYPTION ALGORITHMS SIMULTANEOUSLY WITHOUT A LOSS OF PERFORMANCE

(75) Inventor: Patrick Le Quere, Villebon sur Yvette (FR)

(73) Assignee: BUH HN Information Systems Inc., Billenica, MA (US)

( * ) Notice: Subject to any disclaimer, the term of this patent is extended or adjusted under 35 U.S.C. 154(b) by 861 days.

(21) Appl. No.: 09/706,728

(22) Filed: Nov. 7, 2000

(30) Foreign Application Priority Data

Nov. 9, 1999 (FR) .................................. 99 14067

(51) Int. Cl.
*H04L 9/00* (2006.01)
(52) U.S. Cl. .................... 713/193; 713/185; 380/28; 380/30; 380/266
(58) Field of Classification Search ................ 713/200, 713/100, 193, 194, 159, 168, 185; 235/380; 380/25, 44, 49, 30, 266, 28
See application file for complete search history.

(56) References Cited

U.S. PATENT DOCUMENTS

| | | | |
|---|---|---|---|
| 4,075,691 A * | 2/1978 | Davis et al. .................... 710/64 |
| 4,488,231 A * | 12/1984 | Yu et al. ........................ 710/48 |
| 4,604,683 A * | 8/1986 | Russ et al. .................... 710/100 |
| 4,855,905 A * | 8/1989 | Estrada et al. ................ 709/246 |
| 5,063,596 A * | 11/1991 | Dyke .......................... 713/192 |
| 5,313,587 A * | 5/1994 | Patel et al. ..................... 710/20 |
| 5,333,198 A * | 7/1994 | Houlberg et al. ............. 380/270 |
| H1414 H * | 2/1995 | Borgen ........................ 713/193 |
| 5,586,263 A * | 12/1996 | Katsumata et al. .......... 710/308 |
| 5,621,800 A * | 4/1997 | Weng et al. .................. 380/266 |
| 5,682,027 A * | 10/1997 | Bertina et al. ................ 235/380 |
| 5,805,712 A | 9/1998 | Davis |
| 5,860,021 A * | 1/1999 | Klingman ..................... 712/32 |
| 6,021,201 A * | 2/2000 | Bakhle et al. ................ 713/189 |
| 6,067,407 A * | 5/2000 | Wadsworth et al. .......... 709/224 |
| 6,079,008 A * | 6/2000 | Clery, III ...................... 712/11 |
| 6,169,700 B1 * | 1/2001 | Luo ........................ 365/230.05 |
| 6,357,004 B1 * | 3/2002 | Davis .......................... 713/100 |
| 6,434,699 B1 * | 8/2002 | Jones et al. .................. 713/168 |
| 6,463,537 B1 * | 10/2002 | Tello ........................... 713/182 |

OTHER PUBLICATIONS

IBM Technical Disclosure Bulletin, Cryptographic Microcode Loading Controller for Secure Function, Sep. 1991, NB910934, pp. 1-5.*

* cited by examiner

*Primary Examiner*—Carl Colin
(74) *Attorney, Agent, or Firm*—Russell W. Guenthner; Faith F. Driscoll

(57) ABSTRACT

An encryption circuit for simultaneously processing various encryption algorithms, the circuit being capable of being coupled with a host system hosted by a computing machine. The circuit comprises an input/output module responsible for the data exchanges between the host system and the circuit via a dedicated bus. An encryption module coupled with the input/output module is in charge of the encryption and decryption operations. Isolation means between the input/output module and the encryption module makes the sensitive information stored in the encryption module inaccessible to the host system and ensures the parallelism of the operations performed by the input/output module and the encryption module. The circuit is supported on a peripheral component interconnect card. The circuit is specifically adapted to provide "hardware" protection of computer servers or stations.

17 Claims, 1 Drawing Sheet

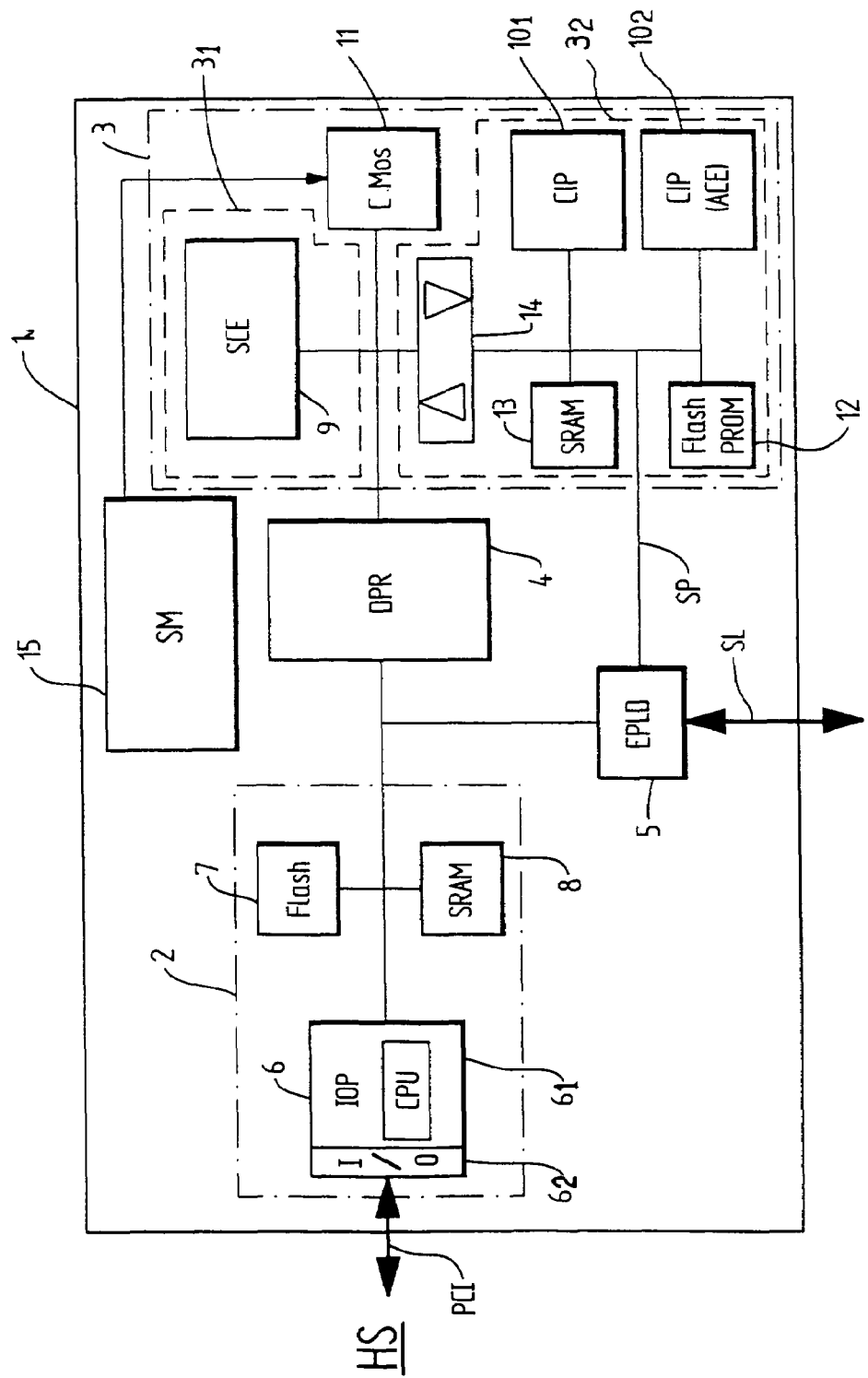

ARCHITECTURE OF AN ENCRYPTION CIRCUIT IMPLEMENTING VARIOUS TYPES OF ENCRYPTION ALGORITHMS SIMULTANEOUSLY WITHOUT A LOSS OF PERFORMANCE

The present invention applies to the field of encryption, and more particularly, relates to an architecture of an encryption circuit implementing various types of encryption algorithms simultaneously.

FIELD OF THE INVENTION

This architecture is embodied by a circuit supported by a PCI (Peripheral Component Interconnect) card, and makes it possible to implement various encryption algorithms in parallel, without a loss of performance in a machine (server or station). It also plays the role of a vault in which the secret elements (keys and certificates) required for any electronic encryption function are stored.

DESCRIPTION OF RELATED ART

The increased need for performance in cryptography, combined with the need for inviolability has led the manufacturers of security systems to favor hardware solutions in the form of additional cards.

Such a card, coupled with a server, constitutes the hardware security element of the server.

There are known implementations of security architectures based on ASIC (Application Specific Integrated Circuit) components, which entail high development costs for a solution that remains inflexible, both on the manufacturer end and on the user end.

Furthermore, there is no architecture existing today that is capable of executing a set of algorithms simultaneously with a guaranteed throughput for each of them.

SUMMARY OF THE INVENTION

The object of the invention is specifically to eliminate the aforementioned drawbacks and to meet the market's new demands for security.

To this end, the subject of the invention is an architecture of an encryption circuit simultaneously processing various encryption algorithms, the circuit being capable of being coupled with a host computer system.

According to the invention, the circuit comprises:
- an input/output module responsible for the data exchanges between the host system and the circuit via a PCI bus;
- an encryption module coupled with the input/output module, in charge of the encryption and decryption operations as well as the storage of all of the circuit's sensitive information; and
- isolation means between the input/output module and the encryption module, for making the sensitive information stored in the encryption module inaccessible to the host system, and for ensuring the parallelism of the operations performed by the input/output module and the encryption module.

The first advantage of the invention is that it allows fast execution of the principal encryption algorithms with two levels of parallelism, a first parallelism of the operations performed by the input/output module and the encryption module, and a second parallelism in the execution of the various encryption algorithms.

Another advantage of the invention is to make invisible to the host system all of the encryption resources made available to the system, and to provide protected storage for secrets such as keys and certificates. The sensitive functions of the card (algorithms and keys) are all located inside the encryption module and are inaccessible from the PCI bus.

The invention also has the advantage of enabling hardware and software implementations of various encryption algorithms to coexist without a loss of performance, while guaranteeing the throughputs of each of them.

It has the further advantage of being scalable by a choice of standard microprocessor and programmable logic technologies, as opposed to more conventional implementations based on specific circuits (ASIC). The invention makes it possible, in particular, to implement proprietary algorithms simply by modifying the code of the encryption processors or by loading a new configuration file for the encryption automata of the encryption module.

BRIEF DESCRIPTION OF THE DRAWINGS

Other advantages and characteristics of the present invention will emerge through the reading of the following description, given in reference to the attached FIGURE, which represents a block diagram of an architecture according to the invention.

DESCRIPTION OF THE PREFERRED EMBODIMENTS

For simplicity's sake, the encryption/decryption module will hereinafter be called the "encryption module."

The links between each module are all two-way links unless indicated.

The encryption circuit 1 according to the invention hinges on two main modules:
- an input/output module 2 responsible for the data exchanges between the encryption resources and a host system HS via a PCI bus; and
- an encryption module 3 in charge of the encryption and decryption operations as well as the storage of the secrets.

These two modules 2 and 3, respectively delimited by an enclosing dot-and-dash line, dialogue via a dual-port memory DPR 4 that allows the exchange of data and commands/statuses between the two modules 2 and 3.

A serial link SL controlled by the encryption module 3 also makes it possible to input the basic keys through a secure path SP independent of the normal functional path (PCI bus), thus meeting the requirement imposed by the FIPS140 standard.

This link SL is connected to the card 1 via a module EPLD 5, or "Erasable Programmable Logic Device," coupled between the input/output module 2 and the encryption module 3, that ensures logical consistency between the modules.

The input/output module 2 includes the following elements:
- a microcontroller IOP 6 primarily constituted by a processor $6_1$ and by a PCI interface $6_2$, integrating DMA (Direct Memory Access) channels. These are channels that are specific, or dedicated, to the processor, through which the data exchanged between the memories passes, and which are coupled with the processor without using the resources of the processor;
- a flash memory 7, which is a memory that saves the stored data without a power source and whose storage capacity is for example 512 kilobytes; and an SRAM memory 8, from the abbreviation for "Static Random Access Memory" which is a memory that requires a power source in order to save the data stored in the memory, and whose storage capacity is for example 2 Megabytes.

The data transfers between the encryption module 3 and the host system HS take place simultaneously with the encryption operations performed by the encryption module 3, thus making it possible to optimize the overall performance of the card 1.

The flash memory 7 contains the code of the processor of the microcontroller IOP 6.

At startup, the processor copies the contents of the flash memory 7 into the SRAM memory 8; the code being executed in this memory for better performance.

The SRAM memory 8 could also be replaced by an SDRAM (Synchronous Dynamic RAM) memory, which is a fast dynamic memory.

The microcontroller IOP 6 is capable of managing this type of memory without a loss of performance.

The choice of the microcontroller depends primarily on the desired performance objectives as well as the total power consumption of the card supporting the circuit, which is generally limited to 25 W (PCI specification).

The dual-port memory DPR 4 provides the isolation between the input/output module 2 and the encryption module 3, thus making the latter inaccessible to the host system HS.

Its storage capacity in the example described is 64 kilobytes. It temporarily stores the data that is to be encrypted or decrypted by the encryption automata of the encryption module 3.

It is divided into two areas:
  a control area, for example of 4 kilobytes, in which the microcontroller IOP 6 writes the control blocks to be sent to the automata; and
  a data area, for example of 60 kilobytes, containing the data to be processed by the automata.

The encryption module 3 includes first and second encryption sub-modules $3_1$ and $3_2$, respectively delimited by an enclosing broken line.

The first sub-module $3_1$ includes an SCE (Symmetric Cipher Engine) component 9, dedicated to the processing of symmetric encryption algorithms, coupled with the bus of the dual-port memory 4.

The second sub-module $3_2$ is dedicated to the processing of asymmetric encryption algorithms.

It is coupled with the bus of the dual-port memory 4, and includes a separate internal bus isolated from the bus of the dual-port memory 4.

It also includes:
  one or two processors CIP $10_1$, $10_2$, from the abbreviation for "Cipher Processor";
  a processor ACE $10_2$, from the abbreviation for "Asymmetric Cipher Processor," which in a variant of embodiment replaces one of the two cipher processors CIP $10_1$, $10_2$;
  a CMOS memory 11, for example with a storage capacity of 256 kilobytes, backed up by a battery;
  a flash memory PROM 12, from the abbreviation for "Programmable Read-Only Memory," for example with a storage capacity of 512 kilobytes; and
  an SRAM memory 13, for example with a storage capacity of 256 kilobytes.

As illustrated in the block diagram of the FIGURE, the SCE component 9 and the CMOS memory 11 are directly coupled with the bus of the dual-port memory DPR 4, while the processors CIP $10_1$ and $10_2$ and the flash 12 and SRAM 13 memories are coupled with a separate bus isolated from the bus of the dual-port memory DPR 4 by means of a bus isolator 14, also called a bus "transceiver," represented in the FIGURE by a block with two opposing arrows.

The flash memory PROM 12 located in the bus of the processors CIP $10_1$ and $10_2$ contains all of the software used by the encryption module 3.

The SRAM memory 13 plays two roles:
  it enables the fast execution of the code of the processors CIP $10_1$ and $10_2$; the code is copied into the memory from the flash memory PROM 12 at power up;
  it also makes it possible to store the data temporarily during the execution of the algorithms.

This characteristic of the architecture guarantees the independence of the various encryption automata from one another.

The processor CIP $10_1$ and the processor ACE $10_2$ both access the dual-port memory DPR 4 in order to read or write the data to be encrypted, but the processing of the algorithms per se takes place entirely within their own memory space (internal cache and SRAM 13) without interfering with the SCE component 9.

The SCE component 9 integrates the various symmetric encryption automata (one automaton per algorithm) of the DES, RC4 or other type, as well as a random number generator, not represented.

Each automaton works independently from the others and accesses the dual-port memory DPR 4 in order to read its control block (written by the microcontroller IOP 6) and the corresponding data to be processed.

The parallelism of the processing thus performed makes it possible to guarantee an optimal throughput for each algorithm even when the automata are used simultaneously.

The only limitation on the processing is imposed by access to the dual-port memory DPR 4, which is shared by all of the automata.

The bandwidth of the data bus to this memory must therefore be greater than the sum of the throughputs of each algorithm in order not to limit their performance.

The SCE component 9 is produced using a programmable technology that is also known as FPGA, or "Field Programmable Gate Array," which is a programmable circuit or chip having a high logic gate density, which provides all of the flexibility required to implement new algorithms, including proprietary algorithms, on demand.

The configuration data for this component is contained in the flash memory PROM 12, and is loaded into the SCE component 9 at power up under the control of the processor CIP $10_1$.

The processor CIP $10_1$, using given programming software, implements the algorithms not implemented in the SCE component 9. It also implements asymmetric algorithms of the RSA type with or without the help of the specialized automaton implemented by the processor ACE $10_2$.

It performs the initialization of the security parameters (keys) via the serial link SL.

The utilization of a high-performance processor at this level guarantees optimal performance in the execution of the algorithms as well as great flexibility for the implementation of additional algorithms.

As a result of this processor, it is also possible to download proprietary algorithms via the serial link SL.

According to a first embodiment, two processors CIP $10_1$ and $10_2$ are implemented:

One of them $10_1$ is required for the execution of the of the RSA algorithm; the other $10_2$ implements the algorithms not yet supported by the SCE component 9.

According to a second embodiment, there is only one processor CIP $10_1$ assisted by a processor ACE $10_2$ that replaces one of the two processors CIP $10_1$ and $10_2$ of the first embodiment, and which implements, in programmable logic, the intensive calculation linked to the protocol of the RSA algorithm.

All of the required algorithms are implemented in programmable logic in automata of the SCE component 9.

This component is produced in programmable FPGA technology.

The CMOS memory 11 contains the keys and other secrets of the card 1. It is backed up by a battery and protected by various known security mechanisms SM 15 which, in case of abnormalities, translate them as an intrusion attempt and erase its contents.

These abnormalities are for example due to:
an abnormal increase or decrease in the temperature;
an abnormal increase or decrease in the supply voltage;
a disencryption of the card;
a physical intrusion attempt (on the card end or the host system end);
etc.

Each of the above events triggers an alarm signal that acts on the reset mechanism of the CMOS memory 11.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. An encryption circuit for simultaneously processing various encryption algorithms, the encryption circuit adapted to be coupled to a host computer system, the encryption circuit comprising:
   an input/output module coupled to the host computer system through a dedicated bus,
      the input/output module handling data exchanges between the host system and the encryption circuit,
      the input/output module comprising a microcontroller and a microcontroller control memory, the microcontroller control memory providing storage for program control of the microcontroller;
   an encryption module performing data encryption and decryption operations, as well as storage of all sensitive information of the encryption circuit; and
   isolation means comprising a dual port memory connected between the input/output module and the encryption module, the isolation means ensuring that the sensitive information stored in the encryption module is inaccessible to the host computer system,
      the dual port memory enabling parallelism between 1) the data exchanges performed by the input/output module and 2) the data encryption and decryption operations performed by the encryption module.

2. An encryption circuit as set forth in claim 1, wherein the encryption module comprises:
   a first encryption sub-module, dedicated to the processing of symmetric encryption algorithms, and being coupled to the first bus of the dual port memory;
   a second encryption sub-module, dedicated to the processing of asymmetric encryption algorithms and being coupled to the first bus of the dual-port memory and including a separate internal second bus isolated from the first bus of the dual-port memory; and
   a CMOS memory, coupled with the dual-port memory via the first bus of the dual-port memory, the CMOS memory containing the encryption keys accessible during execution of encryption algorithms by the first and second encryption sub-modules and the CMOS memory connected to be reset upon detection of an alarm condition protecting the encryption keys from unauthorized access and use.

3. An encryption circuit according to claim 2, wherein the first encryption sub-module comprises an encryption component coupled to the dual-port memory via the first bus of the memory, the encryption component comprising various encryption automata, respectively dedicated to the processing of symmetric encryption algorithms, and the second encryption sub-module comprises at least two encryption processors, respectively dedicated to the processing of asymmetric encryption algorithms, the encryption processors being coupled to the first bus of the dual-port memory via the internal second bus of the second sub-module and a bus isolator that isolates the second bus from the first bus of the dual-port memory.

4. An encryption circuit according to claim 3, wherein the encryption processors of the encryption module are of the CIP configuration.

5. An encryption circuit according to claim 3, wherein one of the two encryption processors is of the CIP type, and in that the other of the two encryption processors is of the ACE configuration.

6. An encryption circuit according to claim 3, wherein one of the two encryption processors is of the ACE configuration comprising a field programmable gate array (FPGA).

7. An encryption circuit according to claim 6, wherein the encryption component is of the SCE configuration.

8. An encryption circuit according to claim 7, wherein the encryption component comprises a field programmable array (FPGA).

9. An encryption circuit according to claim 8, wherein the second encryption sub-module comprises a flash memory PROM and an SRAM memory coupled to the second internal bus of the sub-module.

10. An encryption circuit according to claim 3, further comprising a CMOS memory containing security keys and security mechanisms that trigger a reset mechanism of the CMOS memory in case of an alarm protecting the encryption keys from unauthorized access and use.

11. An encryption circuit as set forth in claim 3, further including a card supporting the circuit.

12. An encryption circuit as set forth in claim 2, further including a card supporting the circuit.

13. An encryption circuit according to claim 1, wherein the microcontroller comprises:
   an input/output processor and a PCI interface integrating DMA channels responsible for executing the data transfers between the host computer system and the circuit; and
   the memory comprises a flash memory containing the code of the input/output processor and a static random access memory that receives a copy of the contents of the flash memory upon startup of the input/output processor.

14. An encryption circuit according to claim 1, comprising a serial link connected to input basic keys through a secure path independent of the dedicated PCI bus, said link controlled by the encryption module.

15. An encryption circuit according to claim 14, wherein the serial link (SL) allows downloading of proprietary algorithms into the first encryption sub-module.

16. An encryption circuit as set forth in claim 1, further including a card supporting the circuit.

17. An encryption circuit for simultaneously processing various encryption algorithms, the encryption circuit adapted to be coupled to a host computer system, the encryption circuit comprising:

an input/output module coupled to the host computer system through a dedicated bus which provides direct access by the encryption circuit to the host system, the input/output module handling data exchanges between the host system bus and the encryption circuit the input/output module comprising a microcontroller and a microcontroller control memory, the microcontroller control memory providing storage for program control of the microcontroller;

an encryption module performing data encryption and decryption operations, as well as storage of all sensitive information of the encryption circuit, the encryption module comprising:

a first encryption sub-module, dedicated to the processing of symmetric encryption algorithms;

a second encryption sub-module, dedicated to the processing of asymmetric encryption algorithms; and a CMOS memory containing the encryption keys accessible during execution of encryption algorithms by the first and second encryption sub-modules and the CMOS memory connected to be reset upon detection of an alarm condition protecting the encryption keys from unauthorized access and use; and isolation means comprising a dual port memory connected between the input/output module and the encryption module, the dual port memory being coupled to a first bus which couples to the first encryption sub-module, said second encryption sub-module and a second bus which couples to the input/output module, the isolation means ensuring that the sensitive information stored in the encryption module is inaccessible to the host computer system and is protected from unauthorized access and use, and the dual port memory enabling a first level of parallelism between 1) the data exchanges performed by the input/output module and 2) the data encryption and decryption operations performed by the encryption module; and a second level of parallelism by providing access to data of the dual port memory during parallel operation of both first and second encryption sub-modules.

\* \* \* \* \*